United States Patent Office.

CHARLES L. TUCKER, OF CHICAGO, ILLINOIS.

Letters Patent No. 114,492, dated May 2, 1871.

IMPROVEMENT IN PREPARATIONS FOR CLARIFYING COFFEE.

The Schedule referred to in these Letters Patent and making part of the same.

I, CHARLES L. TUCKER, of the city of Chicago, in the county of Cook and State of Illinois, have invented a certain new and improved Preparation for Clarifying Coffee, of which the following is a specification.

Heretofore coffee has been clarified by using eggs or fish-skins; but fresh eggs are at times difficult to obtain, or expensive, and fish-skins are not always acceptable; nor are they to be obtained as an article of commerce.

The object of my invention is to furnish a substitute for either or both of them which shall be easily applied, always ready, and inexpensive.

Its nature consists in making a preparation or compound for clarifying coffee of gelatinous substances, and dry the same thoroughly, and pulverize them finely, so that they can be easily handled and be sprinkled into the coffee by a dredge-box, or other suitable article.

To enable others to make and use my preparation, I will describe the same.

I take fish-sounds and tongues, or either, or other gelatinous substance, and if not already salted I salt them and thoroughly dry them; I then pulverize them finely by grinding, grating, or otherwise, so as to reduce them to a powder of about the consistency of Indian-meal. They are then ready for use, or to be put into suitable packages for the market. In use it will be found best to sprinkle the preparation in by means of a dredge-box. It may, however, be sprinkled in by any other convenient means, or by the fingers. About one-half of a tea-spoonful will be sufficient for a gallon of coffee.

When I use fish-sounds or tongues I take those found in the market, and, in drying them, it will be best not to heat them above 150° Fahrenheit. I prefer to make this preparation strongly saline, as the amount of salt contained in the preparation improves the quality of the coffee. The salt may, however, be omitted.

This preparation is always ready and convenient, and in use will be found a most excellent clarifier for coffee.

Pure gelatine may be prepared in the same way; but I prefer substances which have a small portion of insoluble or membranous matter in them.

What I claim as new, and desire to secure by Letters Patent, is—

1. As a new article of manufacture, the ground gelatinous preparation for clarifying coffee, substantially as specified.

2. As a new article of manufacture, ground gelatine and salt, substantially as and for the purposes specified.

CHARLES L. TUCKER.

Witnesses:
L. L. BOND,
FREDK. KOONES.